Nov. 26, 1929.　　　F. A. KOLSTER　　　1,737,089
SIGNALING SYSTEM
Filed June 2, 1924
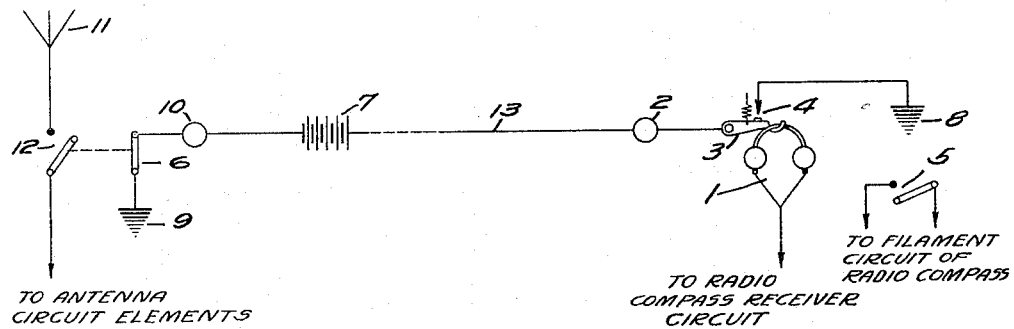
INVENTOR
Frederick A. Kolster
by White Prost Evans
his ATTORNEYS Patented Nov. 26, 1929

1,737,089

UNITED STATES PATENT OFFICE

FREDERICK A. KOLSTER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA

SIGNALING SYSTEM

Application filed June 2, 1924. Serial No. 717,291.

This invention relates to a scheme for signaling between distant points. The invention more particularly is concerned with such a system applied to a radio compass installation, as on shipboard. Such installations are used to determine either the bearing of the ship or that of a distant transmitting station, and this invention makes the operation of the compass more reliable, by serving to apprise the operator whether the conditions are favorable for using the compass.

For example, it is common on shipboard to have a large sized antenna for the transmission and reception of radio messages. When the antenna is connected to be in condition for sending or transmitting, it serves as a factor tending to alter the direction of the wave front of the radiations intended to be picked up by the radio compass. This effect may be still more pronounced if the antenna circuit happens to be tuned near the wave length of the radiations that are intended for the radio compass. The result of such a disturbance is to affect very seriously the accuracy of the radio compass observations, and makes them practically worthless. It is therefore essential to have the antenna circuit open while taking the observations. It is thus one of the objects of my invention to provide a signal that will inform the radio compass operator of the condition of the antenna circuit, so that he may know whether it is safe to take his observations.

Conversely, it is very important that the operator of the antenna system be kept informed as to the radio compass operations, so that he may not inadvertently connect in the antenna while the compass is in use. It is another object of my invention to provide an intelligible signal to the operator of the antenna system, whereby these inadvertent connections may be avoided.

The need of some reliable and simple signaling scheme to produce these effects is imperative, therefore, in order to prevent errors that would render the value of the compass observations insignificant, especially where, as in most instances, the compass control is in the chart room, separated by an appreciable distance from the radio room housing the apparatus controlling the antenna. My invention fulfills the desired requirements in a very simple and efficient manner.

My invention possesses other advantageous features, some of which with the foregoing, will be set forth at length in the following description, where I shall outline in full that form of the invention which I have selected for illustration in the drawing accompanying and forming part of the present specification. Although I have shown in the drawing but one embodiment of my invention, I do not desire to be limited thereto, since the invention as expressed in the claims may be embodied in other forms also.

Referring to the drawing:

The single figure is a wiring diagram of a system embodying my invention and disclosed as applied to a radio compass installation.

The radio compass elements are not illustrated in the figure, since they form no part of my present invention. I indicate in a diagrammatic manner the ear telephones 1 that are connected to the compass receiver for listening to the strength of the signals received by the radio compass. I provide an arrangement whereby a control circuit is operated by the act of lifting up the phones to place them in position on the operator's ears, said control circuit in turn operating a signaling device, such as lamp 2, which will indicate whether the radio compass may safely be used for the taking of bearings. For this purpose, I provide a movable hook 3 upon which the telephones 1 are adapted to be hung, and which controls contacts 4. For example, the hook may be so arranged that it is held down by the weight of the telephones 1 so as to break the control circuit between contacts 4; but when the telephones 1 are lifted off the hook 3, it is permitted to move upwards and close the contacts at 4. For the circuit arrangement illustrated, the operator of the radio compass knows that the antenna is open circuited when the lamp 2 lights after the telephones 1 are taken off the hook 3. He then is free to manipulate the switch 5 which serves to place the radio compass receiver in condition for operation.

Usually since thermionic vacuum tubes are used in the receiver system for the compass, the operative condition of this receiver is produced by lighting the tube filaments, and therefore switch 5 is indicated as controlling the tube filament circuits of the radio compass receiver.

Of course, in order that the lamp 2 behave as set forth, there must be a controlling device in its circuit which is operated in response to the condition of the antenna circuit. Thus a switch 6 adjacent the antenna circuit control may serve this purpose. The remainder of the signal circuit includes a source of electrical energy, such as battery 7, and the ground connections 8 and 9. Another signal lamp 10 is also shown near the antenna control elements, which serves to apprise the radio operator whether the telephones 1 are on or off the hook 3, and therefore whether the radio compass is out of operation or in use. In this way he will know whether he is permitted to use the antenna 11. This antenna is illustrated as having its circuit controlled by a switch 12. It is possible to have a mechanical connection between switches 12 and 6, whereby when switch 12 is closed, switch 6 must be open and vice versa; but under ordinary circumstances such a connection is not necessary, the attendant being depended upon to open and close switch 6 independently, and in accordance with the condition of the antenna circuit. The line or conductor 13 that extends between the chart room (where the radio compass control is located), and the wireless room (where the antenna circuit control is located), may be specially provided for the system, but a wire already in use for other signal or intercommunicating systems could also be used for this purpose. Furthermore, instead of having a ground return, the usual conductor return could be employed.

The operation of the system may now be summarized. Assuming that it is desired to take radio bearings by using the radio compass to receive radiations from a fixed point, the compass operator lifts the telephones 1 off the hook 3. This hook is then released and causes contacts 4 to engage. If the lamp 2 becomes energized, then the operator knows the antenna 11 is inactive and that he can secure accurate bearings. Should the lamp remain dark, the operator communicates through the usual channels with the radio room, and requests the radio operator to open the switch 12 and close switch 6 so as to permit the taking of bearings. When this is done, the lamp 2 is of course lit, and remains so until either the switch 6 is opened or hook 3 is depressed by the weight of telephones 1.

Another feature of the operation resides in the fact that should it be desired to place antenna 12 into operation, the attendant in the radio room can tell from the condition of lamp 10 whether the radio compass is in use or not. He will therefore be warned against the closing of switch 12 when lamp 10 is bright. Of course in any case, when urgent messages are to be received or transmitted, the wireless operator can communicate with the chart room to gain permission to use the antenna.

I claim:

1. A signaling system adapted to signal between the respective operators of a radio compass installation and a nearby independent radio installation having an obsorption circuit sufficiently large to upset observations taken on the radio compass, comprising an electrical signaling device located at each installation, an electrical circuit including each of said signaling devices, a source of electrical energy included in said circuit, a switch located near the operator of the compass installation, means responsive to movement of a part of said compass installation necessarily movable for rendering said compass installation operable for effecting movement of said switch to one position during operation of that installation and to another position while idle, a second switch located near the operator of the nearby installation and adapted to be placed in one position during operation of the same and in another position when the absorption circuit is open and the nearby installation is idle, said switches being associated with said electrical circuit thereby constituting means for signaling to the operator of the compass installation and apprising him as to whether the nearby installation is in operation or is idle.

2. A signaling system adapted to signal between the respective operators of a radio compass installation and a nearby independent radio installation having an absorption circuit sufficiently large to offset observations taken on the radio compass, comprising an electrical signaling device located at each installation, an electrical circuit including each of said signaling devices, a source of electrical energy included in said circuit, switch means located near the operator of the compass installation and adapted to be moved in one position during operation of that installation and another position when idle, means for opening and closing the absorption circuit of the nearby station, switch means operated in response to operation of said last mentioned means, both of said switch means being associated with said electrical circuit thereby constituting means for signaling to the operator of the compass installation and apprising him as to whether the nearby station is in operation or is idle.

3. A signaling system for use in combination with a radio transmitting installation and a nearby separate radio compass installation comprising a switch associated with said transmitting installation and movable to render the same operative or inoperative, an electrical signaling device associated with the compass installation, and means controlled by movement of said switch to effect energization or deenergization of said device, whereby a radio compass operator is informed as to whether said transmitting apparatus is operative or inoperative.

4. A signaling system for use in combination with a radio installation having an antenna circuit and a nearby separate radio compass installation comprising a switch cooperatively associated with said radio installation and movable to render the same operative or inoperative, an electrical signaling device associated with the compass installation, means responsive to movement of said switch electrically associated with said device, means responsive to movement of a part of said compass installation necessarily movable for rendering the same operable for conjointly with said first switch controlling energization and deenergization of said signaling device, whereby when a compass operator attempts operation of the compass installation he is informed as to whether the radio installation is operative or inoperative.

In testimony whereof, I have hereunto set my hand.

FREDERICK A. KOLSTER.